United States Patent [19]

Rodger

[11] 3,975,890
[45] Aug. 24, 1976

[54] AUTOMATIC HEIGHT CONTROL FOR HARVESTING MACHINE

[75] Inventor: Alexander J. Rodger, Louwskraal, South Africa

[73] Assignee: Slattery Manufacturing (Proprietary) Ltd., Potgietersrus, South Africa

[22] Filed: Mar. 6, 1975

[21] Appl. No.: 556,072

[30] Foreign Application Priority Data

Mar. 18, 1974 South Africa.................... 74/1746

[52] U.S. Cl................................. 56/208; 172/407; 172/7; 56/10.2
[51] Int. Cl.².......................................... A01D 67/00
[58] Field of Search................ 56/10.2, 10.3, 10.4, 56/208, 210–217; 172/663, 402, 403, 407, 7; 280/461 A, 490 A

[56] References Cited

UNITED STATES PATENTS 3,182,730   5/1965   Murphy ...................... 280/461 A X
3,800,517   4/1974   Frushour et al. ..................... 56/208

Primary Examiner—Russell R. Kinsey
Attorney, Agent, or Firm—Robert L. Farris

[57] ABSTRACT

Automatic height control system for crop pick up reel of peanut combine. The implement is supported at the front on the draught links of a tractor and at the rear on its own ground wheels. A height sensing wheel adjacent the pick-up reel senses ground contours. A linkage of pivotally interconnected links transmits height control signals from the height sensing wheel to the top control link of the tractor's hitch whereby the tractor's draught control system maintains the reel at constant height.

7 Claims, 5 Drawing Figures

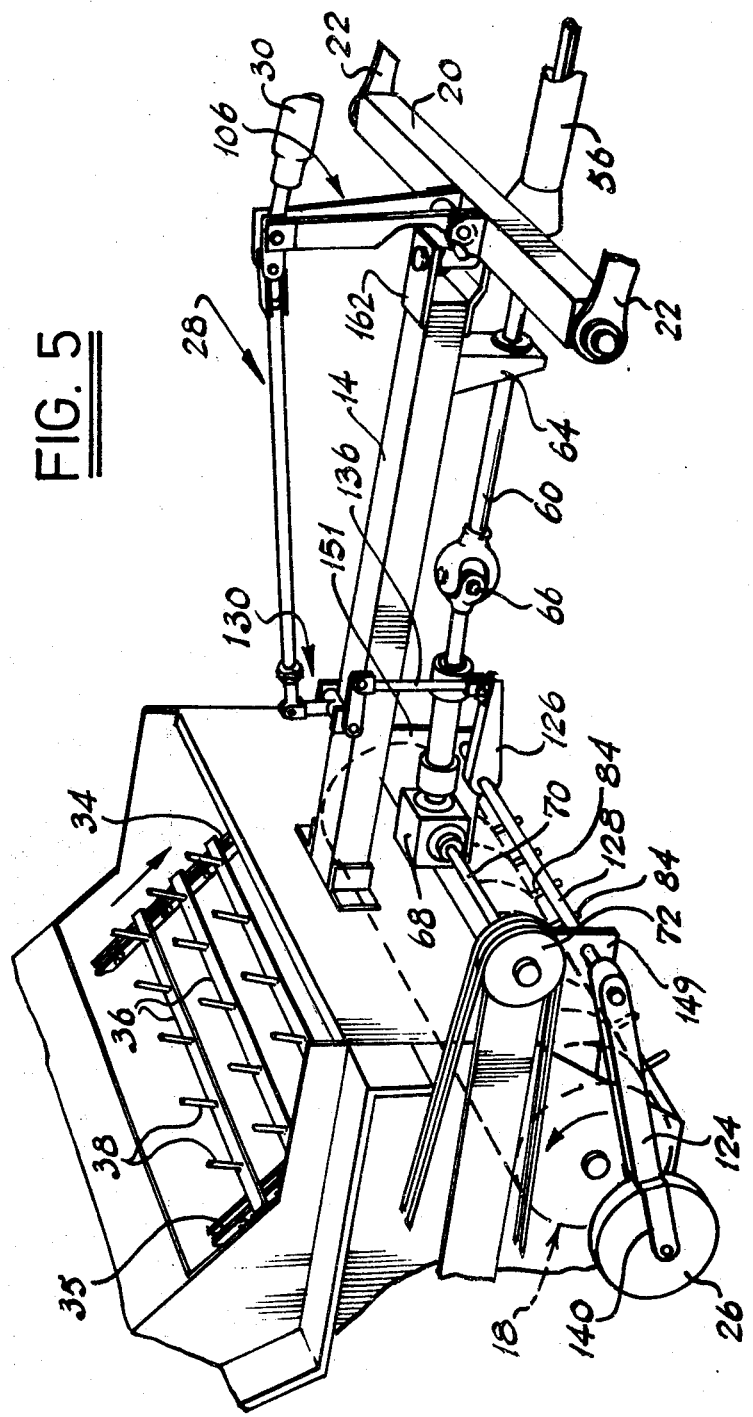

AUTOMATIC HEIGHT CONTROL FOR HARVESTING MACHINE

This invention relates to harvesting machines and in particular to apparatus for controlling the height of crop treatment means of a harvesting machine, such as a pick-up for feeding a windrowed crop into the harvesting machine. The invention is particularly though not exclusively applicable to peanut combines — that is, to harvesting machines adapted to simultaneously collect a crop of peanuts (or groundnuts) and to separate the peanuts from the vines.

In a peanut combine which is intended to operate upon the so-called wet windrow system (in which windrows of partially dried peanut crop are continuously treated by the combine) a crop pick-up reel which may have rotating spring tines is provided at the front of the combine to lift the windrows from the ground and feed them into the combine. However, it is desirable to control the height of the pick up relative to the remainder of the combine in order to ensure that, regardless of varying ground contours, both large and small, the height of the pick-up relative to the ground surface immediately below it remains substantially constant. In this way the efficiency of operation of the pick-up remains constant and the amount of soil picked up from the ground with the windrow can be minimized.

In the past, various methods of controlling the height of crop pick-up devices have been proposed but these have tended to be somewhat sophisticated and therefore costly and not really suited to the harsh conditions of use of peanut harvesting machinery.

An object of the invention is to provide apparatus for controlling the height of a crop pick-up device of a peanut combine, the apparatus being inherently simple and therefore well adapted to be manufactured in a form which is rugged and requires a minimum of maintenance and will stand up to a reasonable amount of misuse.

According to the invention there is provided a crop harvesting machine comprising:

a main body;

a draught member located at the forward end of the main body with respect to the direction of usual forward motion of the harvesting machine;

ground-engageable support means to support the main body, the support means being located rearwardly of said draught member;

crop treatment means mounted on the main body and located between the forward end of the draught member and the ground-engageable support means for engagement with crop on the ground in a field characterized by a transverse mounting member at the forward end of the draught member, the mounting member being adapted for attachment to the two draught links of an agricultural tractor whereby the forward end of the crop harvesting machine is supported by the draught links;

a height sensing member mounted adjacent the crop treatment means so as to rest on the ground during use, the mounting of the height sensing member permitting movement of said member up and down in accordance with ground contours, and a linkage connected at one end to said height sensing member and connectable at its other end to the top link of a tractor, the linkage being operative in use to set up compression or tension in said tractor top link in accordance with up and down movement of the height sensing member.

An embodiment of the invention will now be described by way of example with reference to the accompanying drawings in which:

FIG. 5 shows a perspective view of substantially the same portion of the combine as FIGS. 3 and 4.

Figure 1:
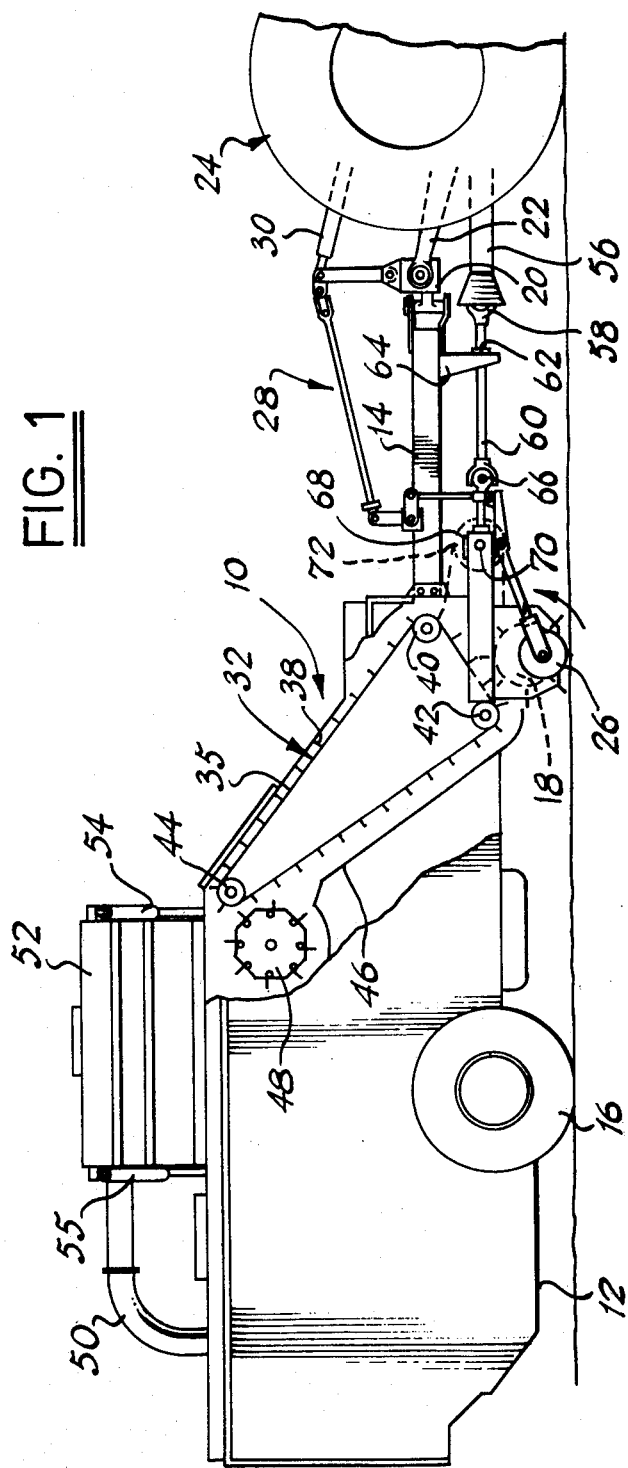
FIG. 1 shows, in side elevation, a tractor drawing a peanut combine.
Figure 2:
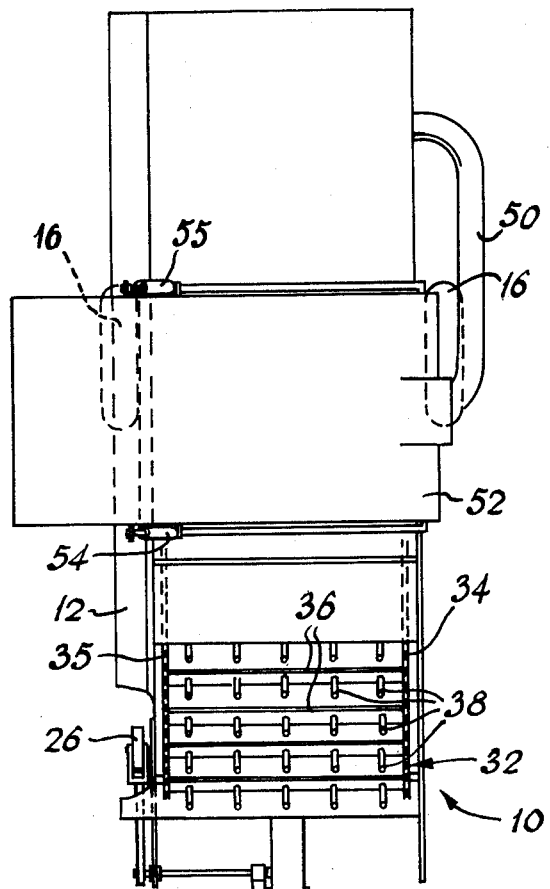
FIG. 2 shows the tractor and peanut combine of FIG. 1 as seen in plan view.
Figure 2:
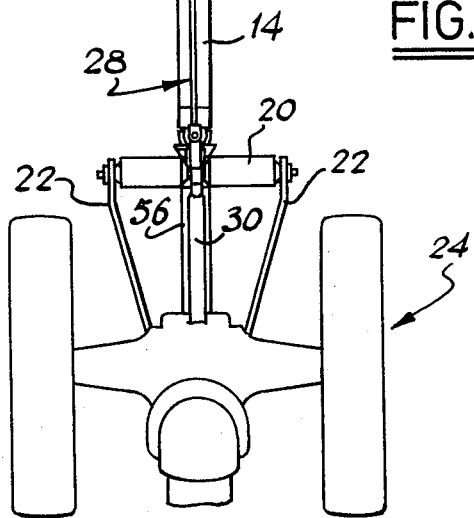

As shown in FIGS. 1 and 2 of the drawings, a crop harvesting machine in the form of a peanut combine 10 comprises a main body 12, a draught member or beam 14 located at the forward end of the main body with respect to the direction of usual forward motion of the combine, and ground engageable support means in the form of wheels 16 to support the main body. Between the wheels 16 and the forward end of draught beam 14 is mounted crop treatment means in the form of a pick-up reel 18 to pick up a windrowed peanut crop and feed it into the combine.

At the forward end of draught beam 14, a transverse mounting member 20 is provided for attachment to the draught links 22 of an agricultural tractor 24 whereby the forward end of the combine 10 is supported by said links in semi-mounted fashion.

The agricultural tractor 24 can be any one of several well-known tractors with a standard three point hitch and top link hydraulic control. Well-known tractor hitches with top link hydraulic control are disclosed in U.S. Pat. Nos. 2,715,863 to Bunting, 3,241,621 to Bunting, 3,275,084 to Bunting, and 3,314,484 to Bunting et al.

A height sensing wheel 26 is mounted adjacent the right hand end of crop pick-up reel 18 and is connected by a linkage 28 to the top control link 30 of tractor 24's three point hitch as will be more fully described below.

Main body 12 houses a conveyor 32 comprising chains 34, 35 and transverse bars 36 carried thereby. A series of transversely spaced outwardly projecting pegs 38 are fixed to each bar for engagement with the crop. Chains 34 are trained round three sprockets 40, 42, 44 as shown in FIG. 1 to follow a generally triangular path. A slotted support plate 46 spaced from the run of the conveyor between sprockets 42 and 44 supports crop as the crop is conveyed over the plate from pick-up reel 18 towards a picking drum 48, while allowing sand to escape through the slots.

Main body 12 also houses apparatus for separating the peanut — containing pods from the vines and from soil and other foreign matter. Apparatus capable of performing these functions is well known and is therefore not described nor fully illustrated here.

After the final stage of separation and cleaning of the peanut pods within main body 12, they are carried by means of an air current through a duct 50 to a bulk tank 52 located almost directly above ground wheels 16. The bulk tank has walls of expanded metal to allow the air to escape. A pair of hydraulic rams 54, 55 are provided to tip the bulk tank towards the right hand side of the machine to empty the nuts into a wagon (not shown) when desired.

Power for driving pick-up reel 18, conveyor 32, picking drum 48 and the other crop treatment apparatus in the peanut combine is obtained from the p.t.o. shaft (not shown) of tractor 24. A shielded primary shaft 56 having universal joints at each end transmits drive from the p.t.o. shaft through its rear universal joint 58 to a secondary shaft 60. Secondary shaft 60 is supported between its ends in a bearing 62 carried by a bracket 64 depending from draught beam 14. Shaft 60 is coupled through a further universal joint 66 to a right angle drive gearbox 68 which drives, through a transverse output shaft 70, a multi-vee belt pulley 72 at the right hand side of the combine from which the drive is transmitted by belts and otherwise to the various parts of the machine.

Figure 3:
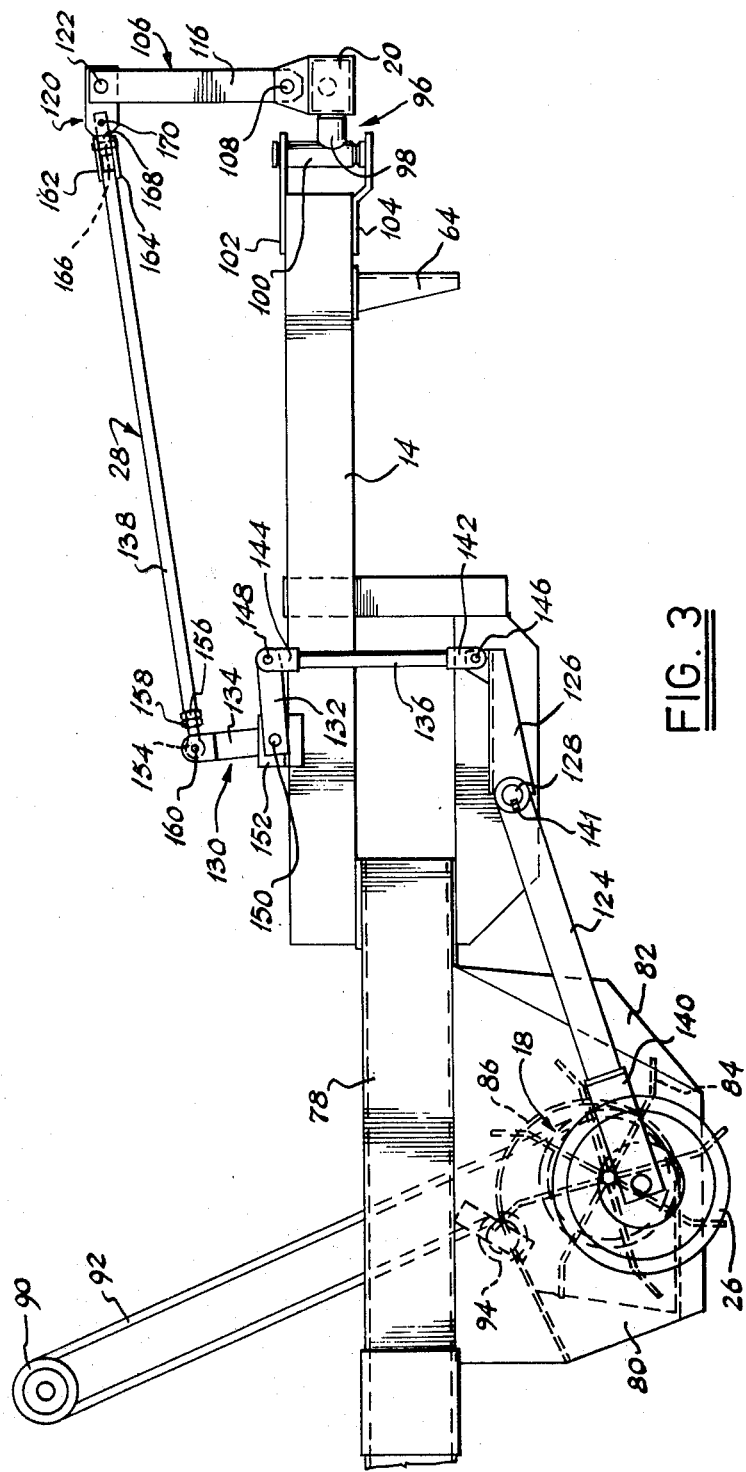
FIG. 3 shows, on a larger scale, a portion of the combine of FIG. 1, including a height sensing wheel and a linkage connected thereto and with certain parts of the combine removed for purposes of illustration.
Figure 4:
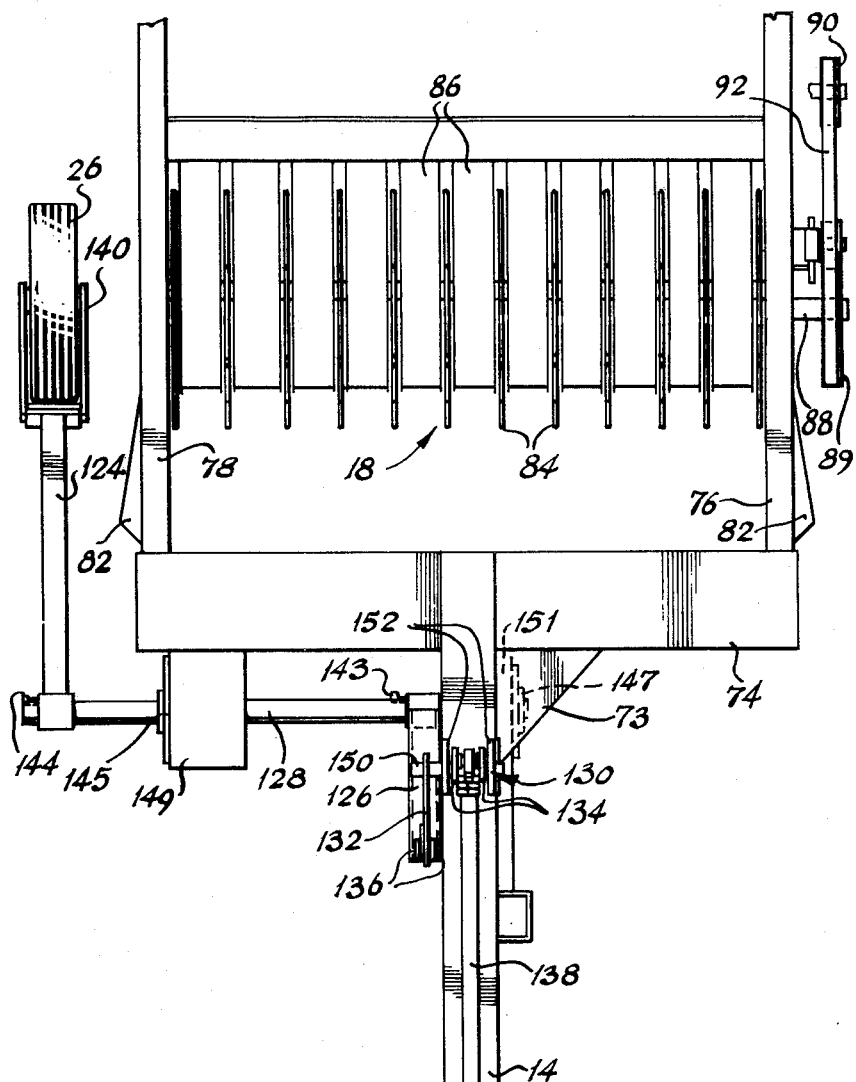
FIG. 4 shows the same portion of the combine as FIG. 3, as seen in plan view.

Referring now to FIGS. 3 and 4 of the drawings draught beam 14 is fixed by means including a horizontal fillet plate 73 to a transverse chassis member 74 of the combine which in turn is fixed at its ends to longitudinal chassis members 76, 78.

Crop pick-up reel 18 is supported from the chassis members by a pair of depending sheet steel plates 80 which each have an outwardly flared leading edge portion 82 for crop gathering purposes.

Reel 18 has a series of spring tines 84 located between smoothly curved generally U-shaped fixed metal spacers 86 and is constructed in a manner similar to the pick-up reel of an agricultural baler. The tines are mounted on a shaft 88 journalled in bearings carried by the plates 80 and extend, feather and retract in the usual manner so as to feed crop over the reel. Shaft 88 carries a pulley 89 and is driven from a pulley 90 by a belt 92 tensioned by a pulley 94.

Transverse mounting member 20 is mounted on draught beam 14 through a joint 96 which permits the mounting member to support the beam while allowing the necessary articulation between tractor and combine. Joint 96 comprises a horizontal forwardly projecting trunnion 98 on which the mounting member is journalled for angular movement about the axis of the trunnion, and a vertical pivot pin 100 fixed at right angles to the trunnion 98 and journalled in a pair of plates 102, 104 fixed to beam 14.

An upwardly extending mast 106 is journalled on a transverse pin 108 between a pair of flanges 110, 112 fixed to transverse mounting member 20.

Mast 106 forms one end of the linkage 28 connecting height sensing wheel 26 to the top link 30 of the tractor. The mast comprises a pair of steel plates 114, 116 rigidly connected at their lower ends by a sleeve 118 journalled on pin 108 and at their upper ends by a U-shaped bracket 120.

Aligned openings 122 are formed in the upper end of mast 106 to receive a pin (not shown) for securing the tractor top link 30 thereto.

Linkage 28 comprises a series of pivotally interconnected rigid link members as follows:

1. a wheel mounting arm 124 extending downwards and rearwards, on which height sensing wheel 26 is mounted;
2. a forwardly extending crank arm 126;
3. a horizontal transverse shaft 128 drivably connecting arms 124 and 126;
4. a bell crank 130 having a horizontal arm 132 and a pair of vertical arms 134;
5. a drop link 136 connecting bell crank 130 to crank arm 126; and
6. a thrust rod 138 connecting bell crank 130 to the top of mast 106.

Describing now the links of linkage 28 in a little more detail, wheel mounting arm 124 has a bifurcated portion 140 at its lower end and its upper end is secured to shaft 128 by a key 141 and an associated keyway. Crank arm 126 is fixed to shaft 128 by a key 143 and an associated keyway. Transverse shaft 128 is journalled in spaced bearings 145, 147 supported by chassis member 74 through respective brackets 149, 151. Drop link 136 has bifurcated ends 142, 144 which are joined by pins 146, 148 to arms 126 and 134 respectively. The arms 132, 134 of bell crank 130 are rigidly joined by a pin 150 whereby the bell crank is pivoted on an upstanding bracket 152 fixed to draught beam 14. Thrust rod 138 comprises a length of square section bar stock. At one end of rod 138, an eye 154 is screw-threadedly received in a nut 156 welded to the rod. The eye is secured in position by a lock nut 158. This arrangement permits length adjustment of the thrust rod. Eye 154 is connected to bell crank 130 by a pin 160. At the other end of thrust rod 138 a pair of plates 162, 164 are welded thereto and connected by an upwardly extending pin 166 to a link 168. Link 168 is itself journalled on a horizontal pin 170 which forms part of U-shaped bracket 120.

In use, pick-up reel 18 lifts windrowed peanut crop and feeds it upwards and inwards to conveyor 32 which itself conveys it to picking drum 48.

As the combine passes over ground providing relatively small scale undulations, height sensing wheel 26 rises and falls relative to the combine as a whole as it passes over the undulations ahead of ground wheels 16. As can be readily seen from FIG. 3 for example, the act of raising wheel 26 causes bell crank 130 to put thrust rod 138 into compression, thereby subjecting the tractor top link 30 to compression also.

The tractor's hydraulic system is set for "draught control," that is, so that the hydraulic system responds in the well known manner to compression and tension in the top link 30 by raising and lowering respectively the draught links 22 from a mean position. The draught control system should be set for "minimum draught" so that it responds with maximum sensitivity to control signals in top link 30.

Accordingly, when height sensing wheel is raised by a ridge in the ground, the tractor's hydraulic system immediately responds by raising draught links 22. This of course raises the front end of the combine, including pick-up reel 18, relative to the ground wheels 16, whereby the pick-up reel is also raised. Conversely, when the height sensing wheel 26 enters a hollow or depression the tension or reduced compression thereby set up in the tractor's top link results in a lowering of draught links 22 and therefore of the crop pick-up reel also. In this way, reel 18 is maintained at more or less constant height from the ground during use.

The principal advantages of the embodiment of the invention described above apart of course from the provision of automatic reel height control lie in its simplicity, and its inherent ruggedness and ability to stand up to arduous conditions of use. Other systems of automatically maintaining a pick-up reel at constant height have been proposed which involve the use of hydraulic rams and valves on the implement. Such systems are inherently expensive and susceptible to breakdown. The embodiment described above merely uses a tractor and a series of rigid interconnected levers to achieve the same result.

Among modifications which could be made in the above discribed embodiment without departing from the scope of the invention are:

1. the use of two or more height sensing members to detect contours or undulations in more than one place;
2. the interconnection of said two or more height sensing members so that the signal transmitted corresponds to the position of the height sensing member with maximum displacement or, for example, to the mean displacement of all the height sensing members;
3. the positioning of the height sensing member or members slightly in front of the pick-up reel so as to offset the response time of the tractor's hydraulic system — should such an offset be needed;
b 4. the use of alternative forms of linkage in place of the rigid links described above e.g. a flexible linkage such as a heavy duty Bowden cable.

it is to be understood that the invention is appplicable not only to peanut combines, but also to any other harvesting machine which is required to cut a standing crop or to pick-up a previously cut crop, and which can be drawn by a tractor in semi-mounted fashion, e.g. a baler, a swather or a crop conditioner.

I claim:

1. A crop harvesting machine comprising:
    a main body;
    a draught member located at the forward end of the main body with respect to the direction of usual forward motion of the harvesting machine;
    a ground-engageable support means to support the main body, the support means being located rearwardly of said draught member;
    crop treatment means mounted on the main body and located between the forward end of the draught member and the ground-engageable support means for engagement with crop on the ground in a field
    characterized by
    a transverse mounting member pivotally attached to the forward end of the draught member for pivotal movement about a vertical and a horizontal axis relative to the draught member, the mounting member being adapted for attachment to the two draught links of an agricultural tractor whereby the forward end of the crop harvesting machine is supported by the draught links;
    a height sensing member mounted adjacent the crop treatment means so as to rest on the ground during use, the mounting of the height sensing member permitting movement of said member up and down in accordance with ground contours,
    a mast pivotally attached to the transverse mounting member and being adapted for connection to a top link of a tractor, and
    a linkage connected at one end to said height sensing member and connected at its other end to the mast pivotally attached to transverse mounting member, the linkage being operative in use, to pivot the mast, and to set up compression or tension in said tractor top link in accordance with up and down movement of the height sensing member.

2. A crop harvesting machine as claimed in claim 1 characterized in that said linkage comprises a series of pivotally interconnected rigid link members.

3. A crop harvesting machine as claimed in claim 2 characterized in that one of said link members is in the form of a bell crank.

4. A crop harvesting machine as claimed in claim 1 characterized in that the height sensing member includes a wheel that rolls on the ground.

5. A crop harvesting machine as claimed in claim 1 characterized in that said height sensing member is mounted for contact with the ground at a position slightly ahead of the crop treatment means.

6. A crop harvesting machine as claimed in claim 1 characterized in that said transverse mounting member is connected to the draught member through a joint permitting pivotal movement of the mounting member relative to the draught member:
    a. about an axis extending generally horizontally and in the fore/aft direction; and
    b. about a vertical axis located at the forward end of the draught member.

7. A crop harvesting machine as claimed in claim 1 characterized in that said machine is in the form of a peanut combine, said crop treatment means being in the form of a crop pick-up reel and said draught member extending parallel to the direction of forward movement of the harvester, the reel being positioned to pick-up crop which, in use, has passed between the wheels of a tractor drawing the harvester.

* * * * *